United States Patent [19]

Sarbacher et al.

[11] Patent Number: 4,491,624

[45] Date of Patent: Jan. 1, 1985

[54] METAL-AIR ELECTROCHEMICAL CELL

[75] Inventors: Robert I. Sarbacher, Palm Beach, Fla.; Harry R. Fechter, Las Vegas, Nev.

[73] Assignee: Synectics, Inc., Las Vegas, Nev.

[21] Appl. No.: 428,873

[22] Filed: Sep. 30, 1982

[51] Int. Cl.$^3$ .............................................. H01M 2/38
[52] U.S. Cl. ........................................ 429/27; 429/69
[58] Field of Search .............................. 429/15, 27, 69

[56]      References Cited
       U.S. PATENT DOCUMENTS

| | | | |
|---|---|---|---|
| 734,546 | 7/1903 | Halsey | 429/69 |
| 737,614 | 9/1903 | Halsey | 429/69 |
| 4,147,839 | 4/1979 | Solomon | 429/15 |
| 4,198,475 | 4/1980 | Zaromb | 429/15 |
| 4,254,190 | 3/1981 | Zaromb | 429/15 |

OTHER PUBLICATIONS

Cooper et al., The Aluminum-Air Battery for Electric Vehicle Propulsion, Energy to the 21st Century Proceedings of the 15th Intersociety Energy Conversion Eng. Conf., Aug. 1980, pp. 1487-1495.

Primary Examiner—Donald L. Walton

[57]         ABSTRACT

An electrochemical cell for which fuel is prepared and introduced under artificial gravity forces. The active metal is deposited through the action of the field on an anode current collecting member, effecting good compaction and reduced cell internal impedance. A microprocessor provides control of the induced gravity, flow rates, temperature, and other variables-enabling the active metal to be controlled in its thickness as well as providing a predetermined separation from the cathode. Abrasion of the cathode and the possibility of shorting are avoided by the presence of outwardly directed radial forces. These forces are induced by rotation of the electrolyte, air cathode, anode collector and the active metal. The forces promote also the passage of moisture laden air through the air cathode elements. Reaction products produced within the cell volume are circulated to an outside container for separation and possible reuse.

10 Claims, 5 Drawing Figures

METAL-AIR ELECTROCHEMICAL CELL

BACKGROUND OF THE INVENTION

Gasoline is more powerful per unit weight than TNT. It is, therefore, not surprising that the internal combustion engine, even though operating at low efficiency, is able to power automobiles quite satisfactorily. Gasoline as a fuel contains nearly 500 times as much energy per pound as the lead acid battery.

It is estimated that the power source for an electric car should be able to store at least 100 watt-hours per pound of battery.

It appears that the use of metals in metal energy cells can provide a range in excess of 200 miles before refueling. Refueling consists of adding metal, water or reactant, and recovery of the reaction products for recycling and reuse, or disposal. The metal fuels that may be of use are Lead, Iron, Zinc, Aluminum, etc Of the alkaline metals, Lithium is particularly energetic and has certain advantage and disadvantages. However, the Aluminum-Air cell can take advantage of the existing, in-place and very large American Aluminum industry, which makes it a preferrable combination.

One finds in various publications a number of excellent descriptions of the theory and some test data for basic aluminum-air batteries. These are discussed in U.C.R.L. 8443, preprint by John Cooper et al, June, 1980; also, preliminary energy use and economic analysis of the aluminum-air battery for Automotive Propulsion, Interplan Corporation, Santa Barbara, Calif., report no. R7908, April 1980.

Aluminum and other metals provide a very energetic, recylcable fuel for powering general purpose vehicles. The energy storage, for example, per KG of aluminum is greater that 300 W-HR. and the specific power may reach 220 W-HR/GK. Howerver, there has been a need for the development of an engineered design of the critical components of the system which can be said to be workable and practical. Attention must be paid to the problems of fuel delivery, current collection and the achieving of ruggedness in delicate or marginal components.

It is anticipated that our invention will be useful in its concentration on a practical reactant cell which will provide the basis for a conpact engine and have the desired characteristics of ruggedness, as well as to provide for convenient replacement and maintenance of critical components.

The use of air cathode electrodes is well known in the art and they have been used sucessfully in a number of working cells. However, there has not been an appropriate negative electrode which can deliver high current, be conveniently replaced, and be free of corrosion effects. There has recently been valuable progress in lessening the corrosion by circulating and/or adding appropriate chemicals to the electrolytes. For example, Cooper, U.S. Pat. No. 4,154,903, issued May 15, 1979 describes a mechanically recharged calcium/air fuel cell with an aqueous NaOH/NaCl electrolyte. It is claimed that the use of the chloride provides a stable active electrode state. Struthers, U.S. Pat. No. 4,275,125 issued June 23, 1981, teaches the use of controlling the ph of the electrolyte by means of a novel addition of electrolyte. Other methods occur to those skilled in the art. Aluminum recently has been effectively and practically used to establish the anodes of air cells. Several of these methods have been published in the literature noted above.

U.S. Pat. No. 3,887,400 shows the circulation of slurry through battery cells to obtain higher current densities and good utilization of fuel. As mentioned in U.S. Pat. No. 4,147,839, excessive, slurry velocities have seemed to be needed to achieve uniformity of the slurry.

U.S. Pat. Nos. 3,414,437 and 4,147,839 also teach the use of active metal powders suspended in electrolytes. The slurries being contacted by metal stirrers to carry current from the cells high internal impedance appears to be inherent in such design.

In U.S. Pat. No. 3,592,698 the active powdered elements are carried on a conveyor belt moving across the face of a collector. Again, there have been devices used to form a slurry electrode by introducing eletrolyte to the cell bottom discharging is at the top. See U.S. Pat. No. 3,879,225. Other improvements are shown and discussed in U.S. Pat. No. 4,147,839.

In this invention the negative electrode of each of the desired number of cells is built up by deposition of active consumeable metal from a metal-electroyte slurry, by the action of induced gravitational forces. These forces are directed radially outward toward an anode current collector. The slurry is prepared outside our reaction chamber by methods known in the art; see, for example, "Selecting Agitator Systems to Suspend Solids in Liquids", Chemical Engineering May 24, 1976 by Gates et al.

Since the fuel is fed continuously at a rate determined by the energy requirements, we do not have to store quantities of metal in pockets, or in vessels. In our cells the reacting volume as illustrated in the drawings is repesentative of, but not restricted to a cell of cylindrical structure. Conical, in some cases has also been sucessful.

The cathode is preferably of gas or water type and several commercial units are available.

In our invention the metal is prepared in proper size, of chips, powder, etc. in a centrally located container from which the metal is "manifolded" to each separate reaction cell. Because the induced gravity forces cause deposition of the particles from the liquid, thus concentrating and compacting them, it is not necessary to use an extremely dense or rapidly moving slurry. Methods are used, but not shown here in detail, to vary electrolyte-metal concentration, to distribute the slurry to the reacting cells, and to control heat generation, velocities, heat dissipation, etc., and to control active metal to cathode or metal to hydrophilic separator distance etc. Various methods of eliminating electrolyte short circuiting are described elsewhere, for example, in U.S. Pat. Nos. 3,522,098, 3,537,904, 4,025,697, etc.

It is worthy of mention that U.S. Pat. No. 4,126,733 notes the possibility of reduced cell performance caused by the use of separators between the anode and cathode. In addition it is mentioned that without such separators, or the use of that patent's technique, shorting of the cells can occur if particles of active metal impinge on the cathode layer. In our invention we enjoy the benefit of a strong radially acting gravitational field which keeps active particles away from the cathode. Thus, although we may choose to have a very thin (or arbitrary) hydrophylic membrane, we are not bound to use such membranes.

DESCRIPTION OF THE PREFERRED EMBODIMENTS

Figure 1:
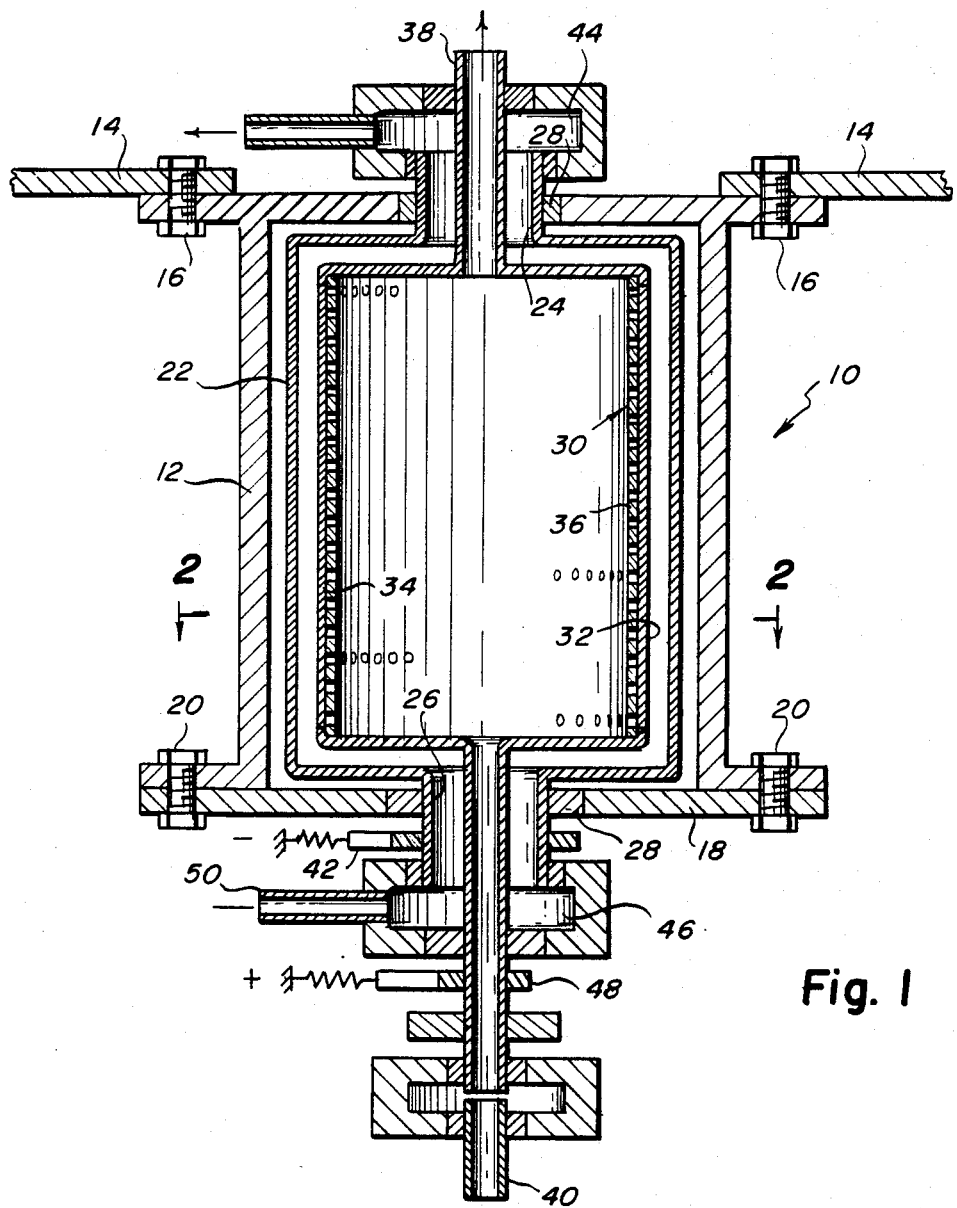
FIG. 1 is a sectional view of the metal-air reacting vessel.
Figure 2:
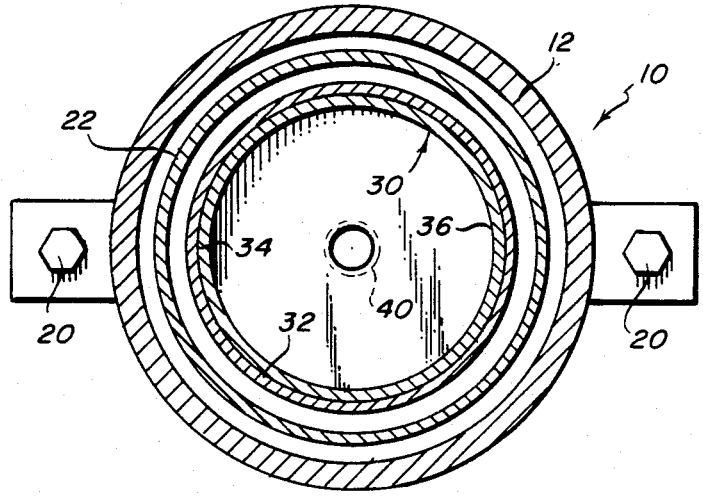
FIG. 2 is a sectional view taken on line 2—2.

The metal-air reacting vessel 10 comprises a clylindrical body 12 secured to a pair of support members 14 by bolts 16. A plate 18 closes the bottom of the body 12 and is secured thereto by bolts 20.

A cylinderical anode-current-collecting member 22 is rotatably mounted within the body 12 and has neck portions 24 and 26 extending through the top and bottom of the body 12. Packing glands 28 are provided to seal the interior of the body 12. The anode collecting member may be coated with nickel or other suitable metal.

An air cathode assembly 30, also in the form of a clyinder is rotatably mounted within the current collecting member 22 and spaced from the wall of the current collecting member 22. The vertical wall of the air cathode assembly comprise an hydrophylic membrane 32, a collecting grid 34 and active element materials with appropriate catalyst 36. The collecting grid 34 may be formed of a nickel mesh coated with a silver layer.

The air cathode assembly 30 has neck portions 38 and 40 extending through the neck portions 24 and 26 of the anode 22.

A slip ring 42 engages the neck portion 26 of anode 22 providing an electrical connection therewith.

The neck portion 24 of the anode 22 is connected to a chamber 44 and the neck portion 26 is connected to a chamber 46. Suitable seals are provided between the neck portions 24 and 26 and the chambers 44 and 46 to permit rotation of the neck portions 24 and 26 relative to said chambers.

The neck portions 38 and 40 of the air cathode assembly extend through the chambers 44 and 46. Seals are provided between the neck portions 38 and 40 and the chambers 44 and 46 to permit rotation of the neck portions 38 and 40 relative to the chambers 44 and 46.

A slip ring 48 engages the neck 40 of the cathode 30 providing an electrical connection therewith.

Suitable means, not shown, are provided to rotate the members 22 and 30.

A slurry of electrolyte and active metal powder of particles enters the chamber 46 through a port 50 and into the space between the anode 22 and the cathode assembly 30. As the slurry passes through the anode 22 and out to chamber 44, the anode 22 and cathode 30 are rotated thereby creating a gravity field force which results in the metal collecting on the walls of the anode 22 until a compact anode is built up to a desired thickness. The electrolyte, deplete of active metal exists through neck portion 24 into chamber 44. From the chamber 44, the spent electrolyte is delivered to a heat exchange, which will be described in detail subsequently.

Air is pumped into the cathode assembly 30 through the neck portion 40. The air is initially filtered and passed through a carbon dioxide remover-scrubber. The air with appropriate moisture enters into the air cathode assembly where it reacts with the cathode material 36, collector 34, and hydrophylic layer 32. Air leaves the cathode assembly through neck portion 38.

For the representative use of Aluminum alloy with 0.05% Gallium, the cell reactions are:

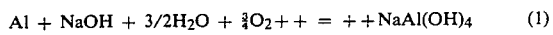  (1)

The sodium aluminate is moderately soluble in hot caustic and precipitates as aluminum trihydroxide (Hydrargillite).

  (2)

Summing we have:

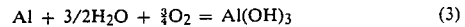  (3)

A percentage of the reaction (1) produces hydrogen according to:

  (4)

(This hydrogen may be used in conjunction with a supplementary power source).

The flow of materials have thus far been described as entering the bottom of the battery and exiting through the top. The flow could be reversed if so desired. Also, the slurry could enter from one end of the battery and the air could enter from the opposite end of the battery with equally satisfactory results.

Figure 3:
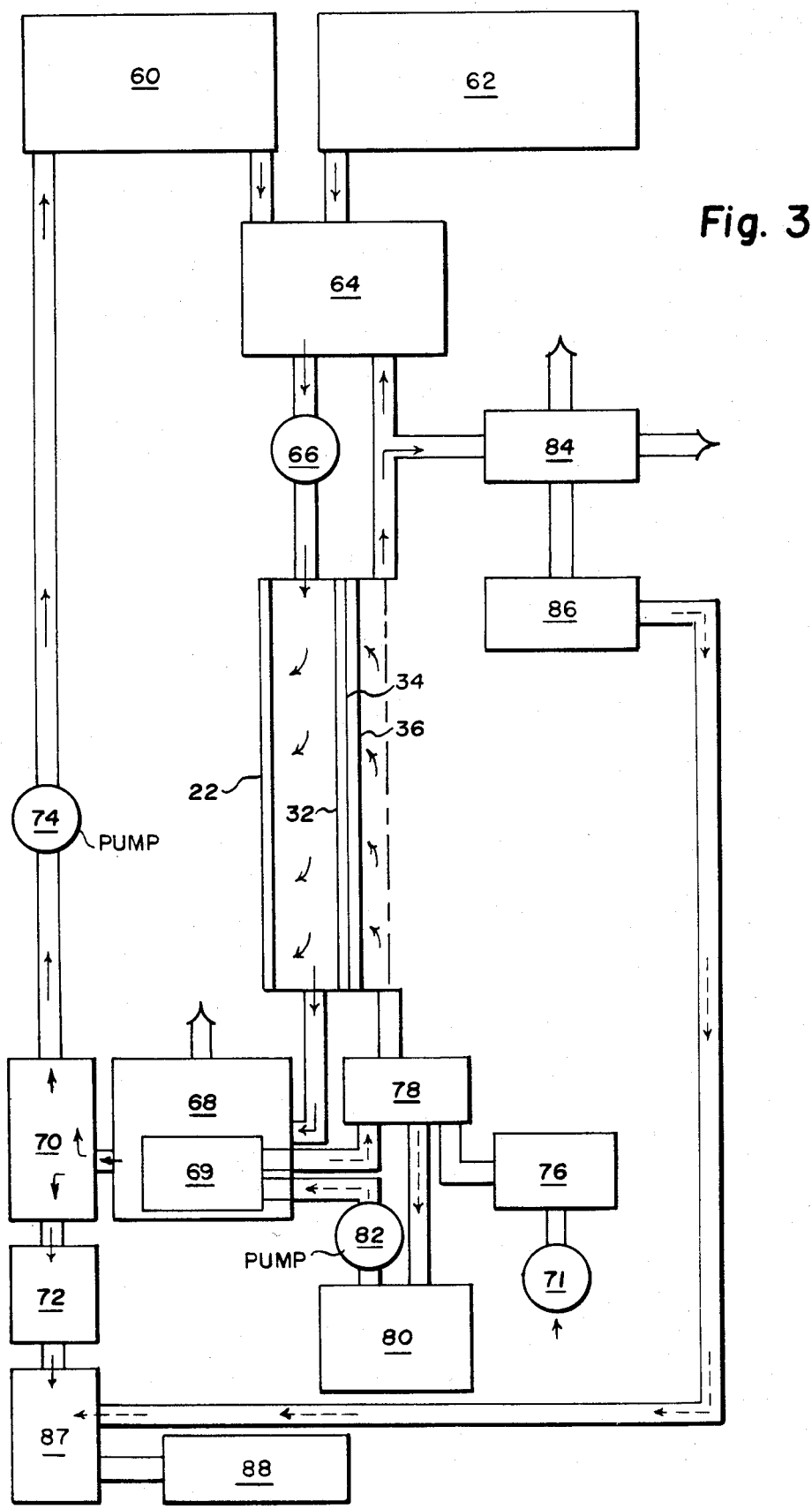
FIG. 3 is a block diagram of the overall system incorporating the metal-air cell, a portion of which is schematically illustrated.

A flow diagram of one system is illustrated in FIG. 3. The electrolyte is stored in a container 60. A metal pulverizer 62 is provided which breaks the active metal into the desired particle size. The electrolyte and metal particles are mixed into a slurry in the chamber 64. The slurry is then pumped into the The spent electrolyte leaves the battery and passes through a heat exchanger 68 to cool the electrolyte prior to entering a processing unit 70 where aluminum hyroxide is removed from the electrolyte and collected in chamber 72 so that it may be processed further to obtain alumina which can be utilized to make aluminum. The cleaned electrolyte is returned to storage container 60 by means of a pump 74.

The air for the battery is pumped via 71 through a filter 76 and then through a scrubber 78 and into the battery.

A water storage tank 80 provides water by means of a pump 82 to the heat exchanger 69 and then to the scrubber 78. The air leaves the battery and passes through a condenser 84 to remove excess moisture before it is exhausted to the atmosphere. The condensate is collected and delivered to the water storage tank 80. A portion of the air may be delivered to the chamber 64 to enhance the mixing of the slurry.

Figure 4:
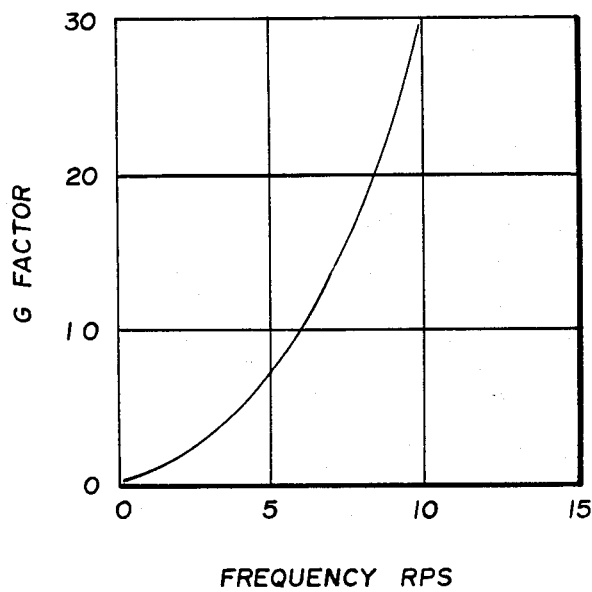
FIG. 4 is a graph plotting the "g" factor against frequency.

Referring to FIG. 4 we show the expression: "g"=$(2=f)^2 r/32$
where:
f is the frequency
r is the radius in feet (=3/12"=¼)
32 refers to the acceleration of 1 "g" of gravity This is plotted versus frequency f in revolutions per second. At a frequency of rotation of 10 rps, we find an acceleration of 30 g. Thus the force on 1 pound of matter is increased to 30 pounds in this gravitational field.

Figure 5:
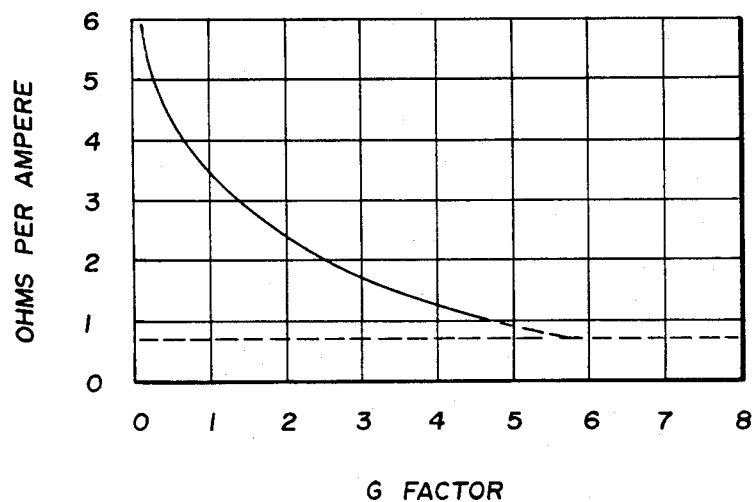
FIG. 5 is a graph representing the decrease in the resistance of the anode collector slurry system as the g factor is increased.

In FIG. 5 we have plotted a curve representing the decrease in the resistance of the anode collector-slurry system as the g factor is increased. The parameters have been arbitrarily chosen and are not meant to be restrictive.

What is claimed is:

1. A metal-air battery system comprising a cell having a rotatable anode mounted therein, a cathode assembly mounted within said anode and rotatable therewith, the wall of said cathode assembly being spaced from the wall of said anode to provide a reactant space therebetween, means for continuously circulating a slurry of electrolyte and metal particles through said reactant space, means for circulating air through said cathode assembly, means for rotating said anode and said cathode assembly to cause said metal particles to become deposited on said anode due to centrifugal force whereby said metal layer is continuously replenished during discharge of said battery.

2. A metal-air battery system as set forth in claim 1 wherein the product of the reaction is collected for further processing.

3. A metal-air battery system as set forth in claim 1 wherein the cathode assembly comprises an hydrophylic membrane, a collecting grid and active element materials.

4. A metal-air battery system as set forth in claim 1 wherein said metal particles are aluminum.

5. A metal-air as set forth in claim 1 wherein said anode is coated with nickel.

6. A metal-air battery system as set forth in claim 1 wherein said metal slurry particles are calcium, iron, magnesium, lithium or other metals, and or their alloys.

7. A metal-air battery system as set forth in claim 1 wherein the compacting and pressing effect of the induced gravitational field on the slurry particles and on the anode current collecting member reduces by a very significant amount the ohmic heat loss associated with slurry type anodes and yields a cell of small internal resistance.

8. A metal-air battery system as set forth in claim 1 wherein the reduction of internal resistance of the anode structure is effected by induced gravity forces resulting in a cell capable of delivering very large currents to external loads.

9. A metal-air battery system as set forth in claim 1 wherein the induced gravity field is highly effective in promoting the flow of moisture laden air through the cathode materials to facilitate reaction with and contact with the selected electrolytes.

10. A metal-air battery system as set forth in claim 1 wherein the use of slurries effects very great surface area for anode reaction providing greatly improved energy output per unit volume of cell.

* * * * *